US009966640B2

(12) United States Patent
Kumagai et al.

(10) Patent No.: US 9,966,640 B2
(45) Date of Patent: May 8, 2018

(54) VEHICLE AND COOLING STRUCTURE FOR POWER SOURCE APPARATUS MOUNTED ON VEHICLE

(75) Inventors: Takanori Kumagai, Toyota (JP); Noboru Oota, Okazaki (JP); Tetsuo Ohdai, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 390 days.

(21) Appl. No.: 14/240,124

(22) PCT Filed: Aug. 31, 2011

(86) PCT No.: PCT/JP2011/004880
§ 371 (c)(1),
(2), (4) Date: Feb. 21, 2014

(87) PCT Pub. No.: WO2013/030890
PCT Pub. Date: Mar. 7, 2013

(65) Prior Publication Data
US 2014/0194049 A1 Jul. 10, 2014

(51) Int. Cl.
*H01M 10/613* (2014.01)
*B60K 1/04* (2006.01)
(Continued)

(52) U.S. Cl.
CPC ........... *H01M 10/5004* (2013.01); *B60K 1/04* (2013.01); *B60L 1/003* (2013.01); *B60L 11/005* (2013.01);
(Continued)

(58) Field of Classification Search
CPC ................ B60K 1/04; B60K 2001/005; B60K 2001/0422; B60L 11/005; B60L 11/1864;
(Continued)

(56) References Cited

U.S. PATENT DOCUMENTS 6,662,891 B2 * 12/2003 Misu ..................... B60K 1/04
180/65.1
2001/0029162 A1 * 10/2001 Yoshinori .......... B60H 1/00007
454/137
(Continued)

FOREIGN PATENT DOCUMENTS

CN 101389502 A 3/2009
JP U 63-176711 11/1988
(Continued)

OTHER PUBLICATIONS

JP2005306239MT, machine translation of JP2005306239A.*
Partial Translation of Oct. 11, 2011 Written Opinion issued in International Patent Application No. PCT/JP2011/004880.

*Primary Examiner* — Gregory Huson
*Assistant Examiner* — Elizabeth M May
(74) *Attorney, Agent, or Firm* — Oliff PLC

(57) ABSTRACT

The efficiency in layout of an exhaust space for a power source apparatus mounted in an in-car space is increased and uncomfortableness is suppressed due to air discharged from the power source apparatus into the in-car space. A vehicle on which a power source apparatus is mounted includes the power source apparatus disposed in an in-car space of the vehicle, a cooling apparatus supplying air within the in-car space to the power source apparatus, and a cooling duct which the air discharged from the power source apparatus flows. The cooling duct is connected to any one of a first cooling flow path formed by a pillar of the vehicle, a second cooling flow path formed by a frame portion of the vehicle and a stepped portion provided for the frame portion, and a third cooling flow path formed by the frame portion and a scuff plate portion.

7 Claims, 3 Drawing Sheets

(51) Int. Cl.
*B60L 1/00* (2006.01)
*B60L 11/00* (2006.01)
*B60L 11/18* (2006.01)
*B60K 1/00* (2006.01)

(52) U.S. Cl.
CPC ....... *B60L 11/1864* (2013.01); *B60L 11/1874* (2013.01); *B60L 11/1877* (2013.01); *B60L 11/1879* (2013.01); *B60L 11/1887* (2013.01); *B60K 2001/005* (2013.01); *B60K 2001/0422* (2013.01); *B60L 2240/34* (2013.01); *Y02T 10/7022* (2013.01); *Y02T 10/7061* (2013.01); *Y02T 90/34* (2013.01)

(58) Field of Classification Search
CPC .............. B60L 11/1874; B60L 11/1877; B60L 11/1879; B60L 11/1887; B60L 1/003; B60L 2240/34; H01M 10/5004; Y02T 10/7022; Y02T 10/7061; Y02T 90/34

USPC .......................................................... 454/143
See application file for complete search history.

(56) References Cited

U.S. PATENT DOCUMENTS

| | | | | |
|---|---|---|---|---|
| 2002/0000314 | A1* | 1/2002 | Danieau | B60H 1/00021 165/203 |
| 2004/0093883 | A1* | 5/2004 | Nakagawa | B60H 1/247 62/244 |
| 2008/0128107 | A1* | 6/2008 | Yoshii | B60H 1/247 165/42 |
| 2010/0170735 | A1* | 7/2010 | Nakamura | B60K 1/04 180/68.5 |
| 2010/0231035 | A1* | 9/2010 | Tsuchiya | B60H 1/00278 307/9.1 |
| 2011/0074184 | A1* | 3/2011 | Hashikawa | B60H 1/00564 296/208 |

FOREIGN PATENT DOCUMENTS

| | | | |
|---|---|---|---|
| JP | A 2000-247260 | 9/2000 | |
| JP | A 2002-96692 | 4/2002 | |
| JP | A 2003-300419 | 10/2003 | |
| JP | A 2005-306239 | 11/2005 | |
| JP | A 2007-223523 | 9/2007 | |
| JP | A 2008-74159 | 4/2008 | |
| WO | WO 2007105430 A2 * | 9/2007 | ........ B60H 1/00278 |

* cited by examiner

VEHICLE AND COOLING STRUCTURE FOR POWER SOURCE APPARATUS MOUNTED ON VEHICLE

TECHNICAL FIELD

The present invention relates to a vehicle on which a power source apparatus is mounted, and more particularly, to a cooling structure for a power source apparatus mounted on a vehicle.

BACKGROUND ART

A battery pack mounted on an electric car or a hybrid car is cooled by a cooling apparatus such as a fan to suppress a temperature rise within the battery pack. A cooling medium such as air fed from the fan flows through the battery pack to achieve heat exchange with a battery module. The air heated by the battery module is then discharged from the battery pack to cool the interior of the battery pack.

The battery pack can be mounted under a seat in an in-car space, for example. In this case, a cooling structure can be employed in which air in the in-car space can be introduced into the battery pack, introduced air flow within the battery pack, and is then discharged to the in-car space.

PRIOR ART DOCUMENTS

Patent Documents

[Patent Document 1] Japanese Patent Laid-Open No. 2003-300419
[Patent Document 2] Japanese Patent Laid-Open No. 2008-074159

DISCLOSURE OF THE INVENTION

Problems to be Solved by the Invention

When the air discharged from the battery pack mounted under the seat comes into contact with an occupant in the in-car space, it makes him or her uncomfortable.

An adequate exhaust space for the battery pack mounted in the in-car space is, however, difficult to reserve in the limited in-car space. Thus, it is difficult to secure the exhaust space for the air discharged from the battery pack (space serving as an exhaust path and the like) so as to prevent the air heated by the battery pack from making the occupant in the in-car space uncomfortable.

It is an object of the present invention to increase the efficiency in layout of an exhaust space for a power source apparatus mounted in an in-car space and to suppress uncomfortableness due to air discharged from the power source apparatus into the in-car space.

Means for Solving the Problems

The present invention provides a vehicle on which a power source apparatus is mounted, including the power source apparatus disposed in an in-car space of the vehicle, a cooling apparatus supplying air within the in-car space to the power source apparatus, and a cooling duct which the air discharged from the power source apparatus flows. The cooling duct is connected to any one of a first cooling flow path formed by a pillar of the vehicle, a second cooling flow path formed by a frame portion of the vehicle and a stepped portion provided for the frame portion, and a third cooling flow path formed by the frame portion and a scuff plate portion provided for the frame portion. Thus, the in-car space can be effectively used without having to provide a individual flow path of the air discharged from the power source apparatus in the in-car space, and the flow path (cooling path) of the air discharged from the power source apparatus can be efficiently secured. The cooling path can be used to appropriately control the temperature of the air which has cooled the power source apparatus before the air is discharged to the in-car space.

The frame portion is a vehicle body frame formed on each side of a lower portion of the pillar, and the first cooling flow path, the second cooling flow path, and the third cooling flow path are coupled to each other through the pillar. This allows the air from the power source apparatus to be discharged to the in-car space through the plurality of flow paths (cooling paths), thereby efficiently controlling the temperature of the air which has cooled the power source apparatus before the discharge to the in-car space.

The cooling duct can be disposed under a seat mounted in the in-car space between the power source apparatus and the pillar and can be directly connected to the pillar. The lower portion of the pillar is formed to have a width in a front-rear direction of the vehicle, the width being increased from top toward bottom of the vehicle, and the cooling duct is connected to the lower portion of the pillar. This can increase the efficiency in layout of the exhaust space for the power source apparatus and achieve a cooling structure in which a sufficient flow amount of air discharged from the power source apparatus (for example, a large exhaust path of air) is ensured.

The cooling duct includes a first cooling duct connected to the pillar on a left side of the vehicle and a second cooling duct connected to the pillar on a right side of the vehicle. In other words, the cooling duct is connected to the pillars on both sides of the left and right of the vehicle. This can cause the air from the power source apparatus to be discharged to the in-car space through the plurality of flow paths (cooling paths), and the plurality of cooling paths can be used to appropriately control the temperature of the air which has cooled the power source apparatus before the discharge to the in-car space.

The present invention also provides a cooling structure for a power source apparatus mounted on a vehicle, including a cooling apparatus supplying air within an in-car space of the vehicle to the power source apparatus, a cooling duct which the air discharged from the power source apparatus flows, and any one of a first cooling flow path formed by a pillar of the vehicle, a second cooling flow path formed by a frame portion of the vehicle and a stepped portion provided for the frame portion, and a third cooling flow path formed by the frame portion and a scuff plate portion provided for the frame portion, connected to the cooling duct. Thus, the in-car space can be effectively used, and the flow path (cooling path) of the air discharged from the power source apparatus can be efficiently secured. The cooling path can be used to appropriately control the temperature of the air which has cooled the power source apparatus before the air is discharged to the in-car space.

Advantage of the Invention

According to the present invention, the air from the power source apparatus is discharged to the in-car space through the cooling flow path formed by the pillar and the like of the vehicle, thereby increasing the efficiency in layout of the exhaust space for the power source apparatus, and suppressing the uncomfortableness due to the air discharged from the power source apparatus into the in-car space after the cooling of the power source apparatus.

MODE FOR CARRYING OUT THE INVENTION

Embodiments of the present invention will hereinafter be described.

Embodiment 1

Figure 1:
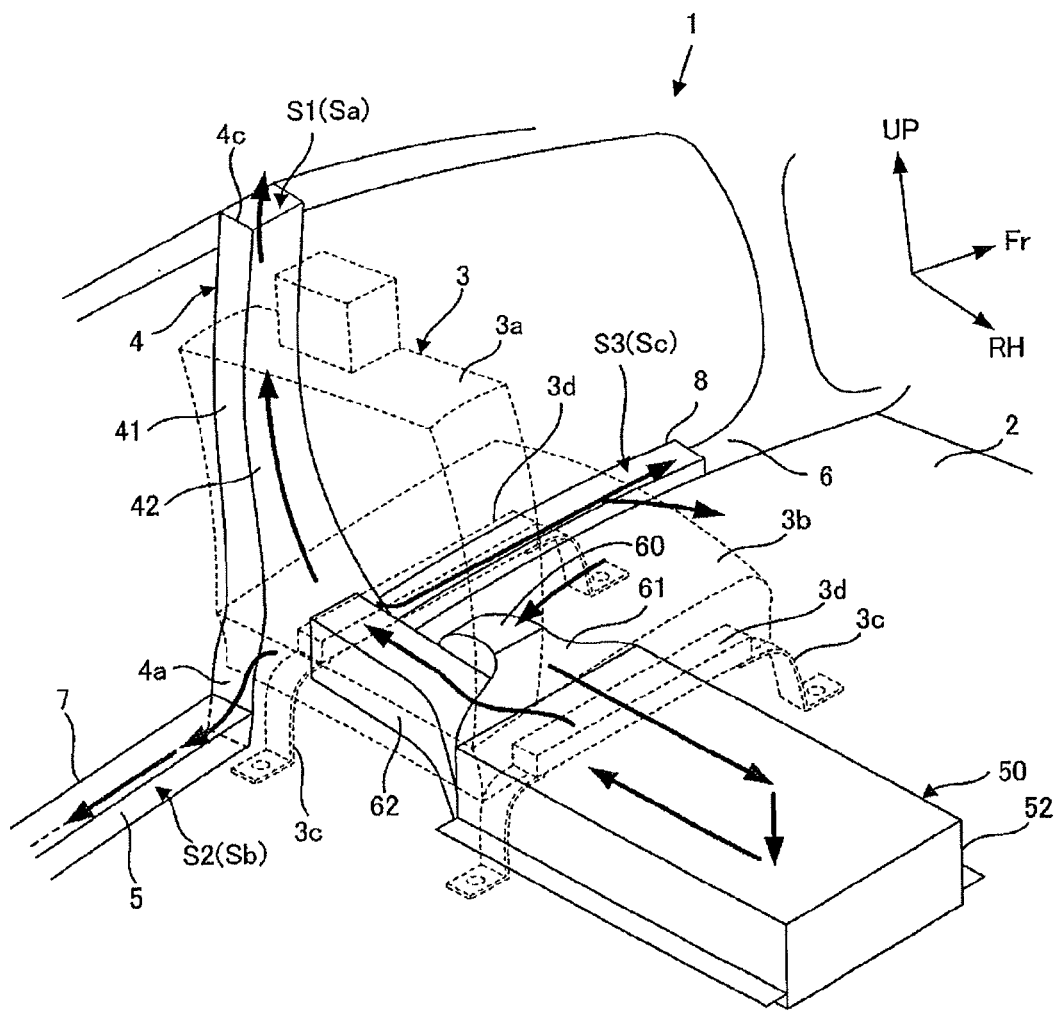
FIG. 1 A schematic diagram of a vehicle on which a power source apparatus according to Embodiment 1 is mounted.

FIG. 1 to FIG. 4 are diagrams showing Embodiment 1. FIG. 1 is a schematic diagram of a vehicle 1 on which a battery pack (power source apparatus) 50 according to the present embodiment is mounted.

The vehicle 1 is, for example, a vehicle such as a hybrid car or an electric car on which the battery pack 50 is mounted. The hybrid car is a vehicle which includes not only the battery pack 50 but also an internal-combustion engine or a fuel cell as the power source for running of the vehicle. The electric car is a vehicle which includes only the battery pack 50 as the power source for the vehicle.

As shown in FIG. 1, the vehicle 1 according to the present embodiment has the battery pack 50 mounted on a floor panel 2 constituting an in-car space R. The battery pack 50 is placed under a front seat 3 disposed over the floor panel 2 and is fixed to the floor panel 2 by a fastening member such as bolts and nuts.

A center pillar 4 (B pillar) is formed generally vertically from the floor panel 2 toward a ceiling (roof portion), not shown, at each of a vehicle left portion 2a and vehicle right portion 2b of the floor panel 2. In the example of FIG. 1, only the center pillar 4 at the vehicle left portion 2a of the floor panel 2 is shown, and the center pillar 4 at the vehicle right portion 2b is omitted.

The center pillar 4 is formed of a pillar portion 41 formed in a concave shape and a pillar garnish portion 42 covering a concaved opening face of the pillar portion 41. A space S1 is formed within the center pillar 4 by the concave portion of the pillar portion 41 and the pillar garnish portion 42. The space S1 extends from a lower portion 4a of the center pillar 4 toward the roof portion of the vehicle 1. The space S1 serves as a cooling path Sa for air discharged from the battery pack 50, as later described.

The lower portion 4a of the center pillar 4 is formed to have a width in a front-rear direction increased from top (closer to the roof portion) to bottom (closer to the floor panel 2) of the vehicle 1.

Side sills 5, 6 are formed on both sides of the lower portion 4a of the center pillar 4 (both sides in the front-rear direction of the vehicle 1).

The side sill 5 is a frame member which couples to the lower portion 4a of the center pillar 4 and extends in a rear direction of the vehicle 1. The side sill 5 is provided with a stepped member 7 on which an occupant can put his or her foot when he or she is in the in-car space R. The stepped member 7 is formed to cover the side sill 5 from the lower portion 4a of the center pillar 4 toward the rear direction of the vehicle 1. A space (gap) S2 is provided between the side sill 5 and the stepped member 7. The space S2 serves as a cooling path Sb for air discharged from the battery pack 50, as later described.

The side sill 6 is a frame member which couples to the lower portion 4a of the center pillar 4 and extends in a front direction of the vehicle 1 opposite to the side sill 5. The side sill 6 is provided with a scuff plate member 8. The scuff plate member 8 is formed to cover the side sill 6 from the lower portion 4a of the center pillar 4 toward the front direction of the vehicle 1. A predetermined space (gap) S3 is provided between the side sill 6 and the scuff plate member 8. The space S3 serves as a cooling path Sc for air discharged from the battery pack 50, as later described.

Each of the center pillar 4 and the side sills 5, 6 can be formed as an integral structure, and the center pillar 4 and the side sills 5, 6 can be coupled to each other to constitute the vehicle 1.

Although FIG. 1 shows the example in which the stepped member 7 is provided with the side sill 5 and the scuff plate member 8 is provided with the side sill 6, the present invention is not limited thereto. For example, the scuff plate member 8 may be provided with the side sill 5. Specifically, the spaces S2 and S3 are formed by associating the stepped member 7 or the scuff plate member 8 with the side sills 5, 6, and for example, each of the spaces S2 and S3 may be formed by each of scuff plate members 8 associated with each of the side sills 5, 6.

The vehicle 1 of the present embodiment has the in-car space R formed by the vehicle body frame such as the side sills 5, 6 and the floor panel 2, and the battery pack 50 is disposed in the in-car space R on the floor panel 2. The in-car space R includes a riding space where an occupant can get on and off and a luggage area for putting luggage and the like.

The front seat 3 has a backrest portion 3a and a seat portion 3b. The vehicle 1 has a space in which the battery pack 50 and an exhaust duct 62, later described, can be placed between the floor panel 2 and a lower face of the seat portion 3b of the front seat 3, and includes a pair of seat mount members 3c for fixing the front seat 3 to the floor panel 2. The seat mount member 3c can include a slide mechanism 3d which slidably moves the front seat 3 in the front-rear direction of the vehicle 1.

Next, description is made of the battery pack 50 mounted on the vehicle 1 of the present embodiment and a cooling structure therefor.

Figure 3:
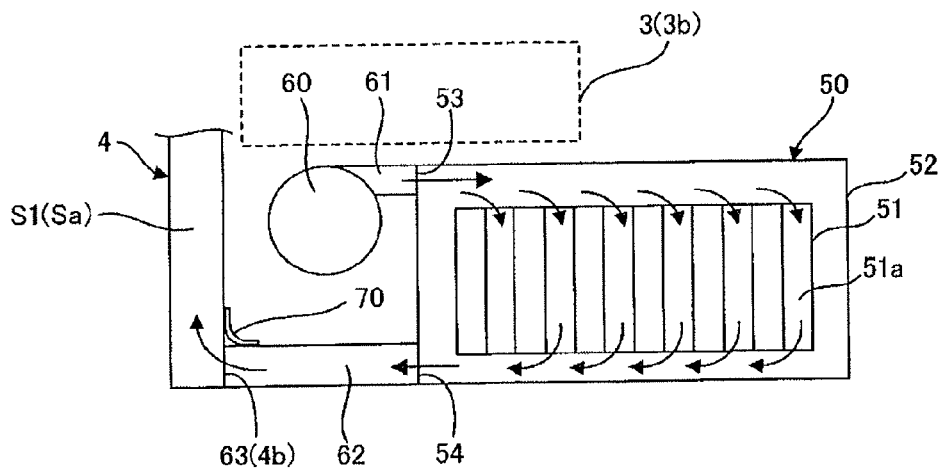
FIG. 3 A section view of the power source apparatus taken along A-A line in FIG. 2.

As shown in FIG. 3, the battery pack 50 has a battery module 51 having a plurality of cells 51a stacked in a predetermined direction and a case member 52 housing the battery module 51. The battery pack 50 is formed in an elongated shape in the direction of the stacking of the plurality of cells 51a. The battery pack 50 is placed under the front seat 3 such that the longitudinal direction (stacking direction) of the battery pack 50 is generally in parallel with the width direction (left-right direction) of the vehicle 1.

Depending on the size and the in-car space structure, the battery pack 50 may be placed, for example, between front seats 3 constituting a driver's seat and a passenger's seat. In this case, the components such as the exhaust duct 62 other than the battery pack 50 are placed in the space between the floor panel 2 and the lower face of the seat portion 3b of the front seat 3.

The battery pack 50 has an intake port 53 for letting in the air within the in-car space R into the case member 52 of the battery pack 50 and an exhaust port 54 for letting out the air which has cooled the battery pack 50. The intake port 53 and the exhaust port 54 are provided on the same side face of the battery pack 50 that faces the center pillar 4, that is, on the side of the battery pack 50 (case member 52) that faces the center pillar 4 generally in parallel in the front-rear direction of the vehicle 1. In the present embodiment, the intake port 53 and the exhaust port 54 face the center pillar 4 at the left portion 2a of the vehicle 1.

Figure 2:
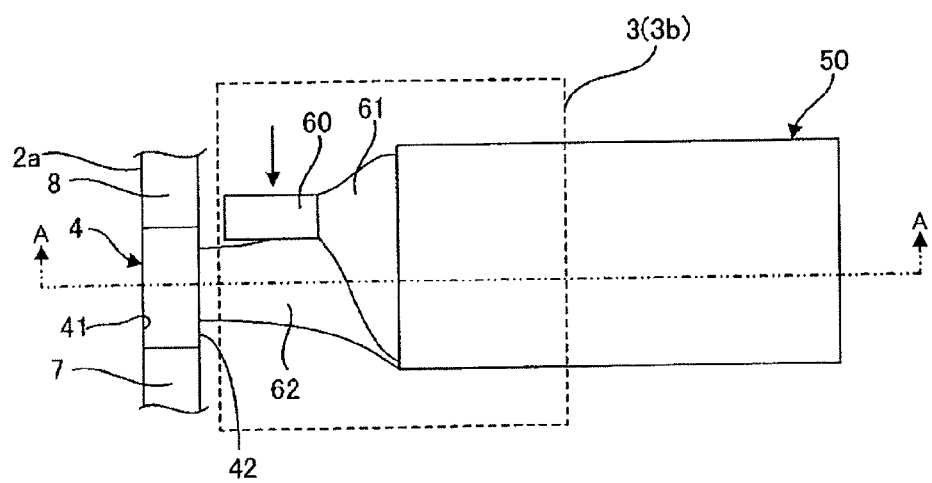
FIG. 2 A plan view of the power source apparatus mounted on the vehicle in FIG. 1.

As shown in FIG. 2, an air blower 60 such as a blower or a fan, an intake duct 61, and the exhaust duct (cooling duct) 62 are disposed under the front seat 3 between the battery pack 50 and the center pillar 4. The air blower 60 is a cooling apparatus for the battery pack 50. The air blower 60 takes in the air within the in-car space R through a predetermined intake port and supplies the air at a predetermined flow rate to the battery pack 50.

The intake duct 61 is a duct which connects to the intake port 53 to direct the air (cooling medium) within the in-car space R fed from the air blower 60 toward the intake port 53. The exhaust duct 62 is a cooling duct which guides the air discharged from the battery pack 50 toward the center pillar 4. The exhaust duct 62 has one end connected to the exhaust port 54 and the other end (connecting opening portion 63) directly connected to the center pillar 4 at the left portion 2a of the vehicle 1.

The lower portion 4a of the center pillar 4 has an opening portion 4b facing the exhaust port 54 of the battery pack 50. The opening portion 4b is connected to the connecting opening portion 63 of the exhaust duct 62. The center pillar 4 may be connected to the exhaust duct 62 such that a portion (end) of the connecting opening portion 63 is located in the lower portion 4a (space S1) of the center pillar 4. The connecting portion between the opening portion 4b of the center pillar 4 and the exhaust duct 62 can be sealed by a seal member 70. The opening portion 4b and the connecting opening portion 63 can have the same shape such as a rectangular or circular shape.

As shown in FIG. 3, the exhaust port 54 is provided below the intake port 53 in a top-bottom direction of the battery pack 50 (top-bottom direction of the vehicle 1). Specifically, the air flows into the battery pack 50 through the intake port 53 provided in an upper portion of the battery pack 50, flows on the periphery of the battery module 51 and between the plurality of cells 51a, and is then discharged through the exhaust port 54 provided in a lower portion of the battery pack 50.

In this manner, the positional relationship between the intake duct 61 and the exhaust duct 62 is set such that the exhaust duct 62 is provided at a lower portion of the battery pack 50 closer to the floor panel 2 and the intake duct 61 (air blower 60) is provided at an upper portion of the battery pack 50 closer to the seat portion 3b of the front seat 3 in the top-bottom direction of the battery pack 50. Thus, the air blower 60, the intake duct 61, and the exhaust duct 62 are placed within the space in the top-bottom direction under the front seat 3 between the battery pack 50 and the center pillar 4.

The air from the battery pack 50 is discharged toward the left portion 2a of the vehicle 1 and is directed toward the lower portion 4a of the center pillar 4 by the exhaust duct 62 without being discharged directly to the in-car space R (for example, to under the front seat 3) from the battery pack 50.

The air discharged from the battery pack 50 and guided to the lower portion 4a of the center pillar 4 flows through the space S1 formed between the concave portion of the pillar portion 41 and the pillar garnish portion 42, the space S2 formed between the side sill 5 and the stepped member 7, or the space S3 formed between the side sill 6 and the scuff plate member 8 before the air is discharged into the in-car space R.

As a result, the in-car space R can be effectively used without having to provide a individual flow path of the air discharged from the battery pack 50 in the in-car space R, and the flow path (cooling path) of the heated air discharged from the battery pack 50 can be efficiently secured. The cooling path can be used to appropriately control the temperature of the heated air which has cooled the battery pack 50 before the air is discharged to the in-car space R.

Typically, an adequate exhaust space for the battery pack mounted in the in-car space R is difficult to secure in the limited in-car space R. For example, when the exhaust space for the air discharged from the battery pack (space where an exhaust path or the like is placed) is formed so as to prevent the air heated by the battery pack from coming into contact with an occupant in the in-car space, the exhaust space cannot be secured adequately in the limited in-car space R. Thus, the exhaust path needs to be reduced in size (both in length and width).

If the adequate exhaust space cannot be secured and thus the exhaust path of the air discharged from the battery pack is reduced in length, the air heated by the battery pack is discharged into the in-car space without being cooled sufficiently to make the occupant uncomfortable. In the present embodiment, however, the in-car space R can be effectively utilized, and the flow path (cooling path) having an adequate length can be efficiently secured for the heated air discharged from the battery pack 50. While the efficiency in layout of the exhaust space for the battery pack 50 is increased, the air discharged from the battery pack 50 to the in-car space R is sufficiently cooled during the flow through the cooling path to suppress the uncomfortableness felt by the occupant.

Since the air discharged from the battery pack 50 toward the in-car space R flows through the cooling path, the velocity of the air flow can be reduced. The air which has cooled the battery pack 50 is sufficiently cooled through the cooling path and is discharged to the in-car space R at the low velocity. This can further suppress the uncomfortableness felt by the occupant.

Figure 4:
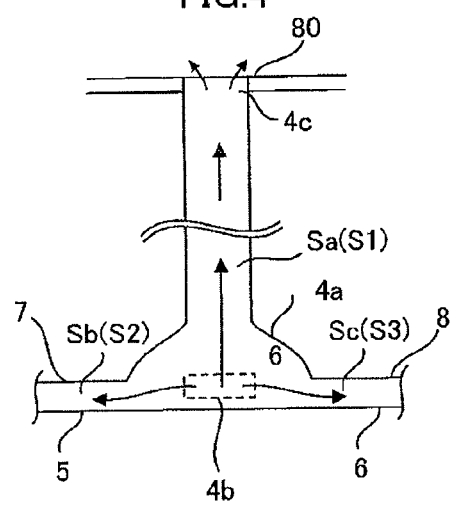
FIG. 4 A schematic diagram of cooling paths in Embodiment 1.

FIG. 4 is a schematic diagram showing the cooling paths Sa, Sb, and Sc in the present embodiment. The cooling paths Sa, Sb, and Sc are the independent cooling paths and are coupled to each other at the lower portion 4a of the center pillar 4. In other words, the space of the lower portion 4a of the center pillar 4 is the space branched to the plurality of cooling paths Sa, Sb, and Sc.

The cooling path Sa is the space S1 formed by the concave portion of the pillar portion 41 and the pillar garnish portion 42. The cooling path Sa causes the air discharged from the battery pack 50 and guided to the lower portion 4a of the center pillar 4 to flow toward the roof portion 80 of the vehicle 1 from the lower portion 4a of the center pillar 4. The air discharged from the battery pack 50 and flowing within the cooling path Sa is then discharged to the in-car space R through a gap in an upper portion 4c of the center pillar 4, for example, a gap between the roof portion 80 and the pillar garnish portion 42.

Sealing or the like can be provided between the pillar portion 41 and the pillar garnish portion 42 from the lower portion 4a to the upper portion 4c of the center pillar 4 to prevent the air discharged from the battery pack 50 from leaking out to the in-car space R during the flow through the cooling path Sa from the lower portion 4a of the center pillar 4 toward the roof portion 80 of the vehicle 1. In this case, the air discharged from the cooling path Sa to the in-car space R can be prevented from contacting the occupant.

As shown in FIG. 4, the lower portion 4a of the center pillar 4 is formed to have the width in the front-rear direction increased from top (closer to the roof portion 80) of the vehicle 1 toward the floor panel 2. Since the opening portion 4b formed in the lower portion 4a of the center pillar 4 can have a large opening area in association with the shape of the wide lower portion 4a, the connecting opening portion 63 of the exhaust duct 62 can have a large opening area accordingly. This can ensure the sufficient flow amount of the air discharged from the battery pack 50 (large exhaust path of the air).

As described above, the adequate exhaust space for the battery pack mounted in the in-car space S is generally difficult to secure in the limited in-car space R. For example, when the adequate exhaust space cannot be secured and thus the exhaust path of the air discharged from the battery pack 50 is reduced in size (the amount of the air flowing through the exhaust path is reduced), the exhaust volume of the air from the battery pack 50 is reduced relative to the intake volume to the battery pack 50 to produce a difference in pressure between the intake side and the exhaust side of the battery pack 50.

When the pressure on the exhaust side of the battery pack 50 is higher than the pressure on the intake side, the air taken into the battery pack 50 may leak through a gap in the case member 52 of the battery pack 50 to come into contact with the occupant. In addition, the higher pressure on the exhaust side of the battery pack 50 may reduce the amount of the air flowing within the battery pack 50 (the amount of air supplied to the battery pack) to reduce the efficiency in cooling the battery pack 50.

In the present embodiment, however, the opening portion 4b formed in the lower portion 4a of the center pillar 4 formed to have the large width can have the large opening area in association with the shape of the wide lower portion 4a to provide the large opening area of the connecting opening portion 63 of the exhaust duct 62 accordingly, thereby ensuring the sufficient flow amount of the air discharged from the battery pack 50 (large exhaust path of the air). This can suppress the difference in pressure between the intake side and the exhaust side of the battery pack 50.

The cooling path Sb is the space S2 formed between the side sill 5 and the stepped member 7. The cooling path Sb causes the air discharged from the battery pack 50 and guided to the lower portion 4a of the center pillar 4 to flow toward the rear direction of the vehicle 1. The air discharged from the battery pack 50 and flowing within the cooling path Sb is then discharged to the in-car space R through a predetermined gap in the stepped member 7 closer to an end portion in the rear direction of the vehicle 1, for example.

The cooling path Sb is the space S3 formed between the side sill 6 and the scuff plate member 8. The cooling path Sc causes the air discharged from the battery pack 50 and directed to the lower portion 4a of the center pillar 4 to flow toward the front direction of the vehicle 1. The air discharged from the battery pack 50 and flowing within the cooling path Sc is then discharged to the in-car space R through a predetermined gap in the scuff plate member 8 closer to an end portion in the front direction of the vehicle 1 or is discharged to a space communicating with the cooling path Sc under a carpet laid over the floor panel 2, for example.

In the present embodiment, the cooling flow path Sa (first cooling path), the cooling flow path Sb (second cooling path), and the cooling flow path Sc (third cooling path) are coupled to each other through the lower portion 4a of the center pillar 4. The air discharged from the battery pack 50 can be discharged to the in-car space R through the plurality of flow paths (cooling paths). As a result, the heated air which has cooled the battery pack 50 can be distributed among the plurality of cooling paths and cooled thereby before the discharge to the in-car space R.

The cooling flow path Sa, the cooling flow path Sb, and the cooling flow path Sc are coupled to each other through the lower portion 4a of the center pillar 4, and the exhaust duct 62 disposed in the space under the front seat 3 between the battery pack 50 and the center pillar 4 is directly connected to the lower portion 4a of the center pillar 4, so that the battery pack 50 can be coupled to each of the cooling paths in the shortest distance to achieve the efficient layout of the exhaust space for the battery pack 50.

Since the cooling flow path Sb is connected to the exhaust duct 62 through the lower portion 4a of the center pillar 4, and similarly, the cooling flow path Sc is connected to the exhaust duct 62 through the lower portion 4a of the center pillar 4, the exhaust duct 62 does not need to be connected directly to the cooling flow path Sb or the cooling flow path Sc. This can eliminate waste of space for connecting the exhaust duct 62 to the cooling flow path Sb and the cooling flow path Sc and can simplify the structure for connecting the exhaust duct 62 to the cooling flow path Sb and the cooling flow path Sc.

In the present embodiment, the exhaust duct 62 may be connected only to the cooling flow path Sb through the lower portion 4a of the center pillar 4, or the exhaust duct 62 may be connected only to the cooling flow path Sc. In this case, the exhaust duct 62 can be inserted into the space formed by the lower portion 4a of the center pillar 4 to connect the connecting opening portion 63 to the opening portion of the cooling flow path Sb or the cooling flow path Sc such that the exhaust duct 62 is connected only to the cooling flow path Sb or only to the cooling flow path Sc.

Embodiment 2

Figure 5:
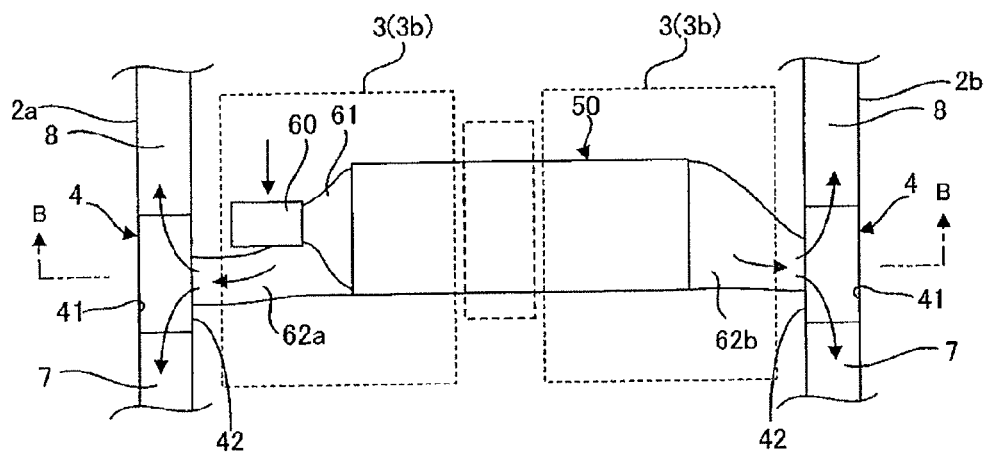
FIG. 5 A plan view of a power source apparatus mounted on a vehicle according to Embodiment 2.
Figure 6:
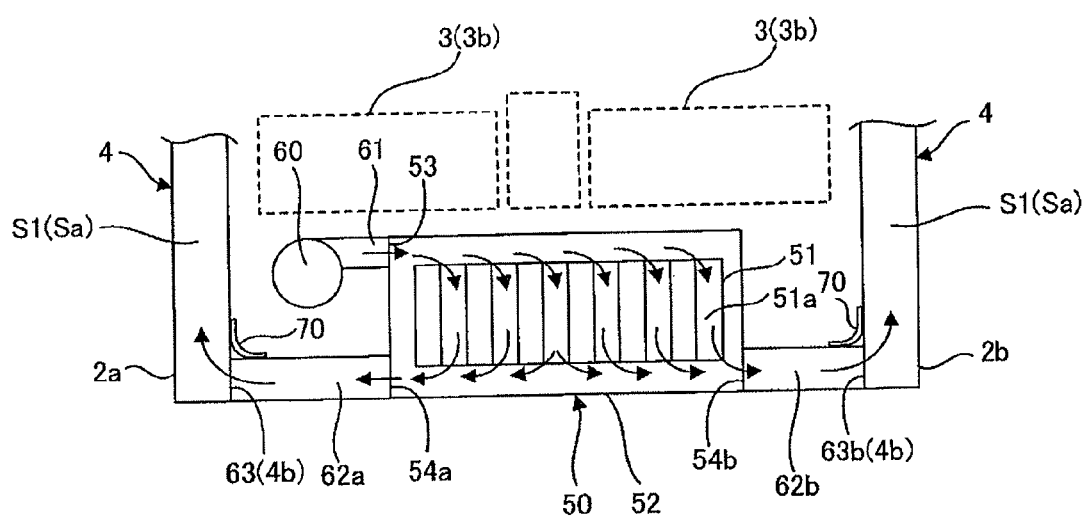
FIG. 6 A section view of the power source apparatus taken along B-B line in FIG. 5.

FIG. 5 and FIG. 6 are diagrams illustrating Embodiment 2. The present embodiment includes an exhaust duct 62 as described in Embodiment 1 which is connected to a center pillar 4 formed at a left portion 2a of a vehicle 1 and to a center pillar 4 formed at a right portion 2b of the vehicle 1. Components identical to those in Embodiment 1 described above are designated with the same reference numerals, and description thereof is omitted.

As shown in FIG. 5, the exhaust duct 62 is formed to include a first exhaust duct 62a connected to the center pillar 4 formed at the left portion 2a of the vehicle 1 and a second exhaust duct 62b connected to the center pillar 4 formed at the right portion 2b of the vehicle 1.

As shown in FIG. 6, a battery pack 50 according to the present embodiment has a first exhaust port 54a and a second exhaust port 54b. The first exhaust port 54a corresponds to the exhaust port 54 in Embodiment 1 described above, and the first exhaust duct 62a corresponds to the exhaust duct 62 in Embodiment 1 described above.

The second exhaust port 54b is formed on the side of the battery pack 50 opposite to the side where the first exhaust port 54a is formed, that is, on the side of the battery pack 50 facing the right portion 2b of the vehicle 1.

The second exhaust duct 62b is a cooling duct which guides air discharged from the battery pack 50 to the center pillar 4 formed at the right portion 2b of the vehicle 1. The exhaust duct 62b has one end connected to the second exhaust port 54b and the other end (connecting opening portion 63b) connected directly to the center pillar 4 at the right portion 2b of the vehicle 1.

The lower portion 4a of the center pillar 4 at the right portion 2b of the vehicle 1 has an opening portion 4b facing the second exhaust port 54b of the battery pack 50. The opening portion 4b is connected to the connecting opening portion 63b of the second exhaust duct 62b. The other configurations are identical to those of the center pillar 4 and the exhaust duct 62 at the left portion 2a of the vehicle 1 in Embodiment 1 described above.

The configuration of a cooling path at the right portion 2b of the vehicle 1 is also identical to that in Embodiment 1. The air is discharged from the battery pack 50 after branching into two directions of a direction toward the left portion 2a of the vehicle 1 (first exhaust port 54a) and a direction toward the right portion 2b of the vehicle 1 (second exhaust port 54b). The air discharged in the direction toward the right portion 2b of the vehicle 1 (second exhaust port 54b) flows through a cooling path Sa formed by the center pillar 4 at the right portion 2b of the vehicle 1, a cooling path Sb formed between a stepped member 7 and a side sill 5 serving as a frame member coupling to the lower portion 4a of the center pillar 4 at the right portion 2b of the vehicle 1 and extending in a rear direction of the vehicle 1, or a cooling path Sc formed between a scuff plate member 8 and a side sill 6 serving as a frame member coupling to the lower portion 4a of the center pillar 4 and extending in a front direction of the vehicle 1 opposite to the side sill 5, followed by discharge to an in-car space R.

In this manner, in the present embodiment, the center pillars 4 on the left and right sides of the vehicle 1 are connected to the first exhaust duct 62a and the second exhaust duct 62b. The air is discharged in the two directions of the direction toward the left portion 2a of the vehicle 1 (first exhaust port 54a) and the direction toward the right portion 2b of the vehicle 1 (second exhaust port 54b), flows through the cooling paths Sa, Sb, and Sc formed on each side, and is discharged to the in-car space R. The in-car space R can be more effectively utilized, and the flow path (cooling path) of the heated air discharged from the battery pack 50 can be efficiently secured. The plurality of cooling paths on each side can be used to control the temperature of the heated air which has cooled the battery pack 50 more appropriately.

Although the embodiments have been described with the example of the vehicle 1 on which the battery pack 50 is disposed under the front seat 3, the present invention is not limited thereto, and the battery pack 50 may be placed under a rear seat. In this case, the exhaust duct 62 can be connected to a pillar (such as a C pillar) located on each of left and right sides of the rear seat in the vehicle, and a cooling path Sa and the like formed by the pillar can be used to appropriately control the temperature of the heated air which has cooled the battery pack 50.

Although the embodiments have been described with the example in which the vehicle 1 has the plurality of cooling paths Sa, Sb, and Sc, the vehicle 1 may have only the cooling path Sa formed by the center pillar 4, or the vehicle may have only the other cooling paths Sb and Sc, for example.

In Embodiment 2 described above, the air blower 60 may be provided under the front seat 3 at the right portion 2b of the vehicle 1 where the second exhaust duct 62b is disposed. In this case, the intake port 53 can be provided on the side of the battery pack 50 where the second exhaust port 54b is provided as shown by FIG. 3 in Embodiment 1.

The cell 51a of the battery pack 50 mounted on the vehicle 1 in the embodiments described above can be provided by using a secondary battery such as a nickel metal hydride battery or a lithium-ion battery. An electric double layer capacitor may be used instead of the secondary battery.

The cell 51a contains a power-generating element (for example, formed by stacking a positive electrode element, a negative electrode element, and a separator (containing an electrolytic solution) disposed between the positive electrode element and the negative electrode element), and two adjacent cells 51a are connected electrically to each other through a bus bar. A pair of end plates are disposed at both ends of the battery module 51. The pair of end plates are restrained by a restraint member to provide the single battery module 51 including the plurality of cells 51a aligned and stacked along one direction.

The invention claimed is:

1. A vehicle on which a battery pack is mounted, comprising:
    the battery pack disposed in an in-car space of the vehicle;
    a cooling apparatus supplying air within the in-car space to the battery pack;
    a cooling duct in which the air discharged from the battery pack flows; and
    a first cooling flow path connected to the cooling duct and formed by a pillar of the vehicle, the pillar extending from a floor panel of the vehicle to a roof portion of the vehicle, an upper end of the pillar being connected to the roof portion;
    a second cooling flow path connected to the cooling duct and formed by a vehicle frame formed on each side of a lower portion of the pillar and a stepped portion provided for the vehicle frame; and
    a third cooling flow path connected to the cooling duct and formed between the vehicle frame and a scuff plate portion provided for the vehicle frame, wherein the first cooling flow path, the second cooling flow path, and the third cooling flow path are coupled to each other through the pillar, and the pillar is directly connected to the cooling duct disposed under a seat mounted in the in-car space between the battery pack and the pillar,
    wherein the first cooling flow path extends from the lower portion of the pillar to the roof portion of the vehicle, and the air is discharged from the roof portion to the in-car space after the air flows through the first cooling flow path,
    wherein a part of the battery pack, the cooling apparatus and the cooling duct are arranged under the seat, and
    wherein the cooling apparatus and the cooling duct are arranged in the in-car space of the vehicle.

2. The vehicle according to claim 1, wherein
    the battery pack is arranged under both of two seats in a left-right direction of the vehicle,
    the cooling apparatus is arranged under one of the two seats, and
    the cooling duct includes a first cooling duct and a second cooling duct, one end of the first cooling duct being connected to the pillar on a left side of the vehicle and an opposite end of the first cooling duct, aligned with the one end of the first cooling duct in the left-right direction of the vehicle, being connected to a first side face of the battery pack on the left side of the vehicle, and one end of the second cooling duct being connected to the pillar on a right side of the vehicle and an opposite end of the second cooling duct, aligned with the one end of the second cooling duct in the left-right direction of the vehicle, being connected to a second side face of the battery pack on the right side of the vehicle.

3. The vehicle according to claim 1, wherein the first cooling flow path is formed by a pillar portion with concave shape and a pillar garnish covering a concaved opening face of the pillar portion.

4. The vehicle according to claim 1, wherein the lower portion of the pillar is formed to have a width in a front-rear direction of the vehicle, the width being increased from top toward bottom of the vehicle, and the cooling duct is connected to the lower portion of the pillar.

5. The vehicle according to claim 4, wherein the battery pack is arranged under both of two seats in a left-right direction of the vehicle, the cooling apparatus is arranged under one of the two seats, and the cooling duct includes a first cooling duct and a second cooling duct, one end of the first cooling duct being connected to the pillar on a left side of the vehicle and an opposite end of the first cooling duct, aligned with the one end of the first cooling duct in the left-right direction of the vehicle, being connected to a first side face of the battery pack on the left side of the vehicle, and one end of the second cooling duct being connected to the pillar on a right side of the vehicle and an opposite end of the second cooling duct, aligned with the one end of the second cooling duct in the left-right direction of the vehicle, being connected to a second side face of the battery pack on the right side of the vehicle.

6. A cooling structure for a battery pack mounted on a vehicle, comprising:

a cooling apparatus supplying air within an in-car space of the vehicle to the battery pack;

a cooling duct in which the air discharged from the battery pack flows;

a first cooling flow path connected to the cooling duct and formed by a pillar of the vehicle, the pillar extending from a floor panel of the vehicle to a roof portion of the vehicle, an upper end of the pillar being connected to the roof portion;

a second cooling flow path connected to the cooling duct and formed by a vehicle frame formed on each side of a lower portion of the pillar and a stepped portion provided for the vehicle frame; and a third cooling flow path connected to the cooling duct and formed between the vehicle frame and a scuff plate portion provided for the vehicle frame, wherein the first cooling flow path, the second cooling flow path, and the third cooling flow path are coupled to each other through the pillar, and the pillar is directly connected to the cooling duct disposed under a seat mounted in the in-car space between the battery pack and the pillar, wherein the first cooling flow path extends from the lower portion of the pillar to the roof portion of the vehicle, and the air is discharged from the roof portion to the in-car space after the air flows through the first cooling flow path, wherein a part of the battery pack, the cooling apparatus and the cooling duct are arranged under the seat, and wherein the cooling apparatus and the cooling duct are arranged in the in-car space of the vehicle.

7. The cooling structure according to claim 1, wherein the first cooling flow path is formed by a pillar portion with concave shape and a pillar garnish covering a concaved opening face of the pillar portion.

* * * * *